US008918228B2

(12) United States Patent
Nagai et al.

(10) Patent No.: US 8,918,228 B2
(45) Date of Patent: Dec. 23, 2014

(54) VEHICLE BEHAVIOR DATA STORING APPARATUS

(75) Inventors: Takayuki Nagai, Kariya (JP); Yuuji Nagano, Obu (JP); Yoshinori Ban, Anjo (JP); Yoshio Nakagaki, Toyota (JP); Kokichi Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 13/372,658

(22) Filed: Feb. 14, 2012

(65) Prior Publication Data

US 2012/0209450 A1 Aug. 16, 2012

(30) Foreign Application Priority Data

Feb. 14, 2011 (JP) .................................. 2011-28620

(51) Int. Cl.
*G06F 7/00* (2006.01)
*G06F 7/06* (2006.01)

(52) U.S. Cl.
CPC .................................... *C07C 5/085* (2013.01)
USPC ............................ 701/1; 340/459; 455/404.2

(58) Field of Classification Search
CPC .............. G06F 7/00; G06F 7/06; B60T 8/172
USPC ............................ 701/1; 340/459; 455/404.2
See application file for complete search history.

(56) References Cited

U.S. PATENT DOCUMENTS 6,092,005 A * 7/2000 Okada .............................. 701/1
2007/0158333 A1* 7/2007 Kosaka et al. ................ 219/483
2007/0290867 A1* 12/2007 Kuramori et al. ............. 340/576
2008/0120025 A1* 5/2008 Naitou et al. ................. 701/207
2009/0091439 A1* 4/2009 Sekiyama et al. ............ 340/459
2010/0069035 A1* 3/2010 Johnson ..................... 455/404.1
2010/0106301 A1* 4/2010 Leppa et al. .................. 700/275
2010/0235748 A1* 9/2010 Johnson et al. ............... 715/730
2011/0021145 A1* 1/2011 Johnson et al. .............. 455/41.2
2011/0151837 A1* 6/2011 Winbush, III .............. 455/412.1
2011/0196572 A1* 8/2011 Tsuchikiri et al. .............. 701/35
2012/0062238 A1* 3/2012 Kawasaki et al. ............. 324/433

FOREIGN PATENT DOCUMENTS

JP 7-009880 1/1995
JP 2005-291173 10/2005
JP 2007-133588 5/2007

(Continued)

OTHER PUBLICATIONS

Office Action (2 pages) dated Jan. 29, 2013 issued in corresponding Japanese Application No. 2011-028620 and English translation (3 pages).

*Primary Examiner* — Fadey Jabr
*Assistant Examiner* — Martin Weeks
(74) *Attorney, Agent, or Firm* — Nixon & Vanderhye PC

(57) ABSTRACT

An engine ECU compares an acceleration value with a reference value, which corresponds to an accelerator operation value inputted in response to a user operation on an accelerator pedal, and stores vehicle behavior data when the acceleration value exceeds the reference value. After determining that the acceleration value is larger than the reference value and storing the vehicle behavior data, the reference value is changed to a larger value. After determining that the acceleration value is smaller than the reference value and, for example, a period in which the acceleration value remains lower than the reference value, reaches a set period, the reference value is changed to a smaller value. Thus, the number of times of storing the vehicle behavior data is equalized among vehicle users.

10 Claims, 9 Drawing Sheets

(56) References Cited

FOREIGN PATENT DOCUMENTS

| | | |
|---|---|---|
| JP | 2008-089426 | 4/2008 |
| JP | 2009-205368 | 9/2009 |
| JP | 2010-061681 | 3/2010 |
| JP | 2010-224793 | 10/2010 |
| WO | WO 2007/058358 | 5/2007 |

* cited by examiner

VEHICLE BEHAVIOR DATA STORING APPARATUS

CROSS REFERENCE TO RELATED APPLICATION

This application is based on and incorporates herein by reference Japanese patent application No. 2011-28620 filed on Feb. 14, 2011.

FIELD OF TECHNOLOGY

The present disclosure relates to a vehicle behavior data storing apparatus, which is capable of storing vehicle behavior data indicative of vehicle behavior.

BACKGROUND

A conventional vehicle behavior data storing apparatus, which stores vehicle behavior data when vehicle behavior is determined to be abnormal, is disclosed in, for example, JP 2009-205368A. In this apparatus, the vehicle behavior is detected by various sensors and the vehicle behavior data indicating the detected vehicle behavior is compared with a reference value to check whether the detected vehicle behavior corresponds to occurrence of abnormal behavior of the vehicle.

Vehicle driving style (for example, manner of acceleration) differs from user to user, and hence vehicle behavior data indicating vehicle behavior generally differs among users. If the reference value, with which the vehicle behavior data is compared, is a fixed value, it is likely that the apparatus and the user recognize abnormality of vehicle behavior differently from each other. For example, although the apparatus determines that the vehicle behavior is abnormal, the user recognizes the same behavior to be not abnormal. In other cases, although the apparatus determines that the vehicle behavior is not abnormal, the user recognizes the same behavior to be abnormal. Because of difference in vehicle driving styles among users, a volume of the vehicle behavior data to be stored differs among the users. That is, the volume of vehicle behavior data to be stored increases as the apparatus determines that the vehicle behavior is abnormal more often. The volume of vehicle behavior data to be stored decreases as the apparatus determines that the vehicle behavior is abnormal less often.

SUMMARY

It is an object of the present disclosure to provide a vehicle behavior data storing apparatus, which reduces variations in the number of determinations of vehicle behavior abnormality among vehicle users.

A vehicle behavior data storing apparatus according to the present disclosure is connected electrically to a sensor provided in a vehicle and provided with a memory and a processor. The processor is configured to compare at least one of vehicle behavior data indicating vehicle behavior with a reference value stored in the memory, and store in the memory the vehicle behavior data when the at least one of vehicle behavior data satisfies a predetermined condition relative to the reference value. The processor is configured to change the reference value after storing of the vehicle behavior data in the memory such that, in case of having stored the vehicle behavior data in the memory, the predetermined condition is satisfied less frequently even when the vehicle behavior data of a same value are generated in succession after the storing of the vehicle behavior data in the memory.

DETAILED DESCRIPTION

A vehicle behavior data storing apparatus, which is implemented in an engine electronic control unit (ECU) mounted in a vehicle, will be described below with reference to FIG. 1 to FIG. 9.

Figure 1:
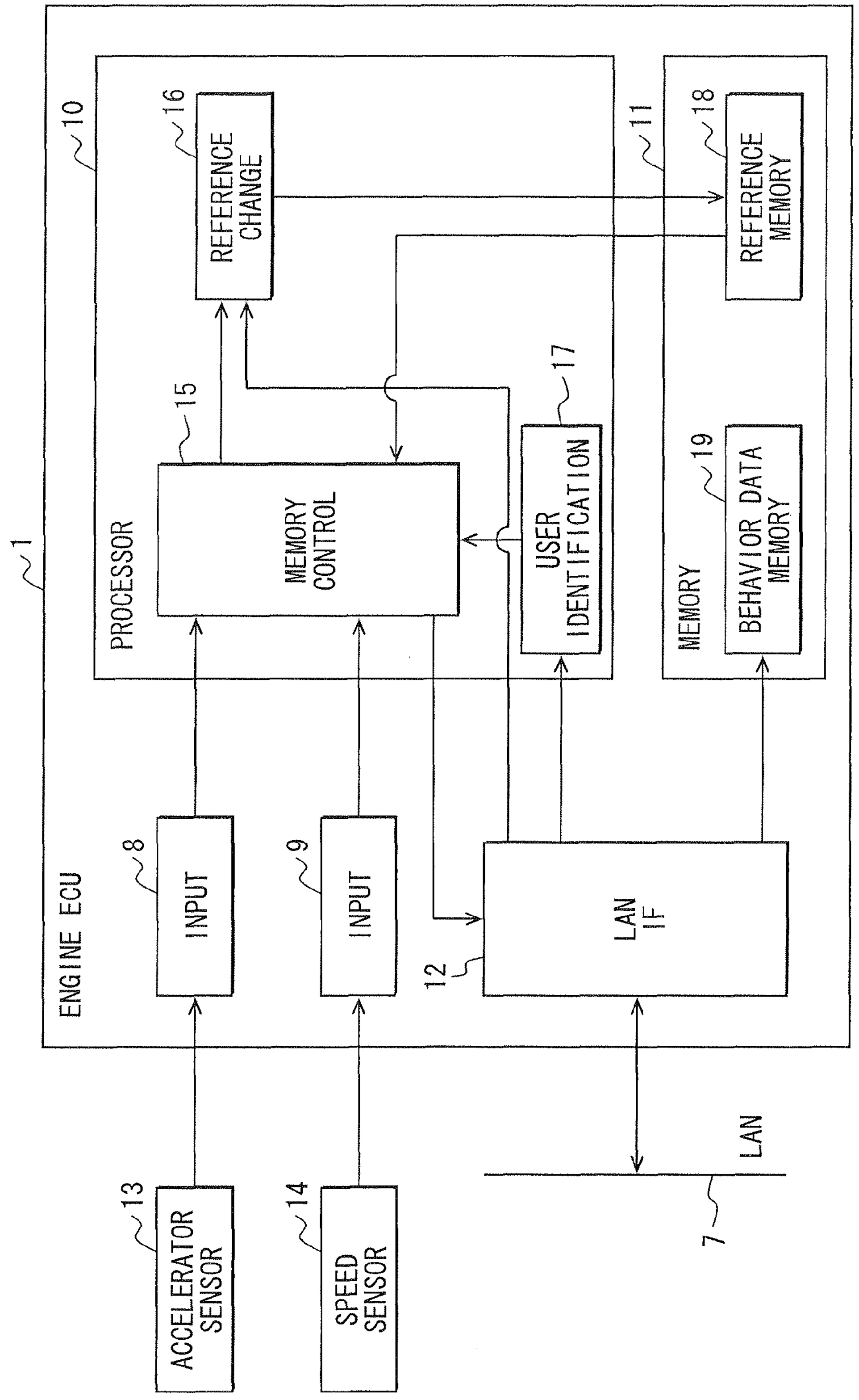
FIG. 1 is a functional block diagram showing one embodiment of a vehicle behavior data storing apparatus.

Referring to FIG. 1, an engine ECU 1, which is formed of a microcomputer as a main part, includes an accelerator operation value input part 8, a vehicle speed sensor value input part 9 (both corresponding to vehicle behavior value input part), a processor (central processing unit) 10, a memory 11, and a vehicle LAN interface (IF) part 12 (corresponding to vehicle behavior data input part) connected to a vehicle LAN 7.

The accelerator operation value input part 8 is connected to an accelerator sensor 13, which detects an operation amount of an accelerator pedal operated by a user. The accelerator operation value input part 8 inputs from the accelerator sensor 13 the accelerator operation value indicating an operation amount of the accelerator pedal operated by the user, and outputs the inputted accelerator operation amount to the processor 10. The vehicle speed sensor value input part 9 is connected to a vehicle speed sensor 14, which detects a vehicle speed. The vehicle speed sensor value input part 9 inputs from the vehicle speed sensor 14 a vehicle speed value as a vehicle behavior value) indicating a detected vehicle speed, calculates an acceleration value indicating an acceleration of the vehicle by differentiating the inputted vehicle speed sensor value by time, and outputs the calculated acceleration value to the processor 10.

The processor 10 includes a memory control part 15, a reference value changing part 16 and a user identification part 17. The memory control part 15, the reference value changing part 16 and the user identification part 17 are shown as functions performed by the processor 10 of the microcomputer. The memory 11 includes a reference value memory part 18 and a vehicle behavior data memory part 19. The reference value memory part 18 and the vehicle behavior data memory part 19 are shown as functions performed by the memory 11 provided inside or outside the microcomputer.

The reference value memory part 18 stores reference values corresponding to accelerator operation values for different users. That is, the reference value memory part 18 stores the accelerator operation value and the reference value corresponding to each user. For example, assuming that the accelerator operation value is between 0% (fully closed) to 100% (fully open), reference values A1 and A2 are adopted as the reference value when a user A operates the accelerator pedal in a range from 0% to 50% and in a range from 51% to 100%, respectively. On the other hand, reference values B1 and B2 are adopted as the reference value when a user B operates the accelerator pedal in the range from 0% to 50% and in the range from 51% to 100%, respectively.

Figure 2:
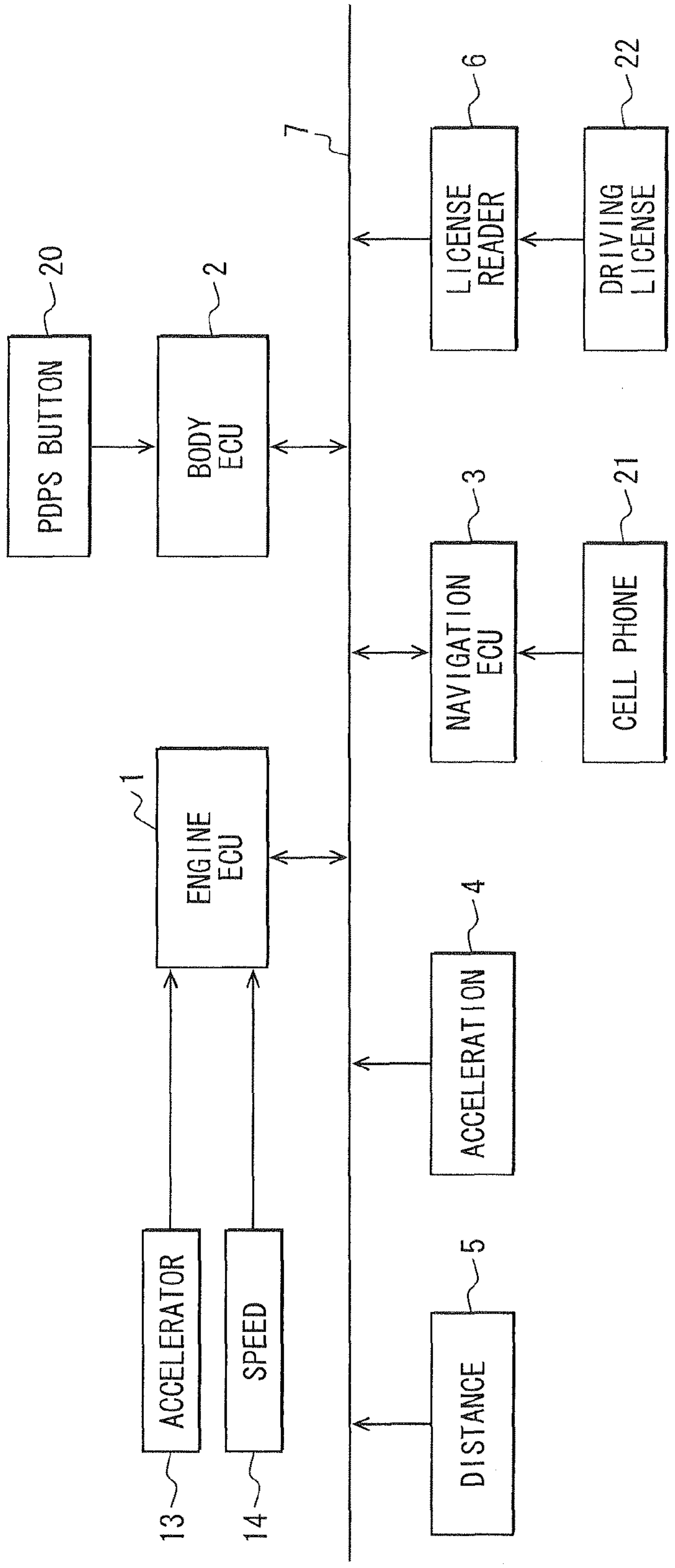
FIG. 2 is a functional block diagram showing an engine ECU and its peripheral parts in the embodiment.

As shown in FIG. 2, the engine ECU 1 is connected to a body ECU 2, a navigation ECU 3, various sensors, which include an acceleration sensor 4, a distance sensor 5, and a driving license reader 6 through the vehicle LAN 7.

The vehicle LAN IF part 12 inputs from any one of the body ECU 2, the navigation ECU 3 and the driving license reader 6 user identification data through the vehicle LAN 7, and outputs the inputted user identification data to the user identification part 17. When the user identification data is inputted from the vehicle LAN IF part 12, the user identification part 17 identifies the user based on the inputted user identification data and outputs a user identification result indicating the identified user to the memory control part 15.

When the accelerator operation value is inputted from the accelerator operation value input part 8 and the user identification result is inputted from the user identification part 17, the memory control part 15 reads out the accelerator operation value and a reference value corresponding to the user from the reference value memory part 18 and inputs the acceleration value from the vehicle speed value input part 9. The memory control part 15 compares the inputted acceleration value with the read reference value and outputs a determination result to the reference value changing part 16. The memory control part 15 outputs a storing command to the part 12 when the acceleration value exceeds the reference value, that is, when the vehicle behavior is determined to correspond to the abnormal behavior.

The determination result is inputted from the memory control part 15. When the reference value changing part 16 recognizes that the acceleration value is in excess of the reference value based on the inputted determination result, the reference value changing part 16 learns (changes if necessary) the reference value based on processing described later and stores the learned reference value in the reference value memory part 18 thereby updating the reference value by learning.

The vehicle behavior data is inputted to the vehicle LAN IF part 12 from the ECUs through the vehicle LAN 7. When a storing command is further inputted from the memory control part 15, the vehicle LAN IF part 12 causes the vehicle behavior data memory part 19 to store the inputted vehicle behavior data. The vehicle behavior data includes items or pieces of information such as accelerator operation amount, engine rotation speed, vehicle speed, coolant temperature, operation amount, target value, command value of electronic throttle operation, shift position and cruise control state. When the distance sensor value is inputted from the distance sensor 5 through the vehicle LAN 7, the vehicle LAN IF part 12 outputs the inputted distance sensor value to the reference value changing part 16.

The body ECU 2 is connected with a PDPS button 20, which is a component of a personal driving position system (PDPS). The PDPS automatically adjusts a seat position, a steering position and the like in correspondence to each user when the user manipulates the PDPS button 20. When the PDPS button 20 is operated, the body ECU 2 outputs a user identification data to the vehicle LAN 7 so that the user operating the PDPS button 20 may be identified.

The navigation ECU 3 has conventional navigation functions of specifying a present position of a vehicle, setting a travel destination, searching a travel path of the vehicle from the present position to the destination, guiding the vehicle along the searched path and drawing a map on a display device. The navigation ECU 3 is connectable with a cell phone 21 (corresponding to a personal effect), which is carried by a user. The navigation ECU 3 identifies device information (for example, phone number information) of the cell phone 21, which is connected, and outputs to the vehicle LAN 7 user identification data, by which the user carrying the cell phone 21 can be identified. The navigation ECU 3 and the cell phone 21 may be wire-connected or wireless-connected by Bluetooth (registered trademark) or a wireless LAN.

The driving license reader 6 electromagnetically reads a driving license data recorded in a driving license 22 (corresponding to a personal effect), which is carried by a user, and outputs to the vehicle LAN 7 user identification data, by which the user carrying the driving license can be identified. The acceleration sensor 4 detects an acceleration and outputs an acceleration value indicative of the detected acceleration. The distance sensor 5 detects a travel distance and outputs a travel distance value indicative of the detected travel distance.

Figure 3:
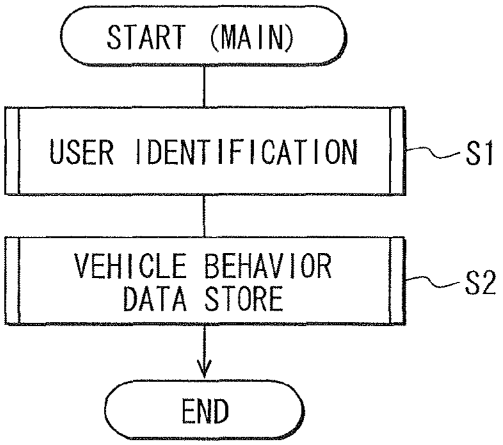
FIG. 3 is a flowchart showing a main routine executed in the embodiment.

The operation of the above-described embodiment will be described next with reference to FIG. 3 to FIG. 9, which show processing executed by the engine ECU 1 as flowcharts. The engine ECU 1 starts and stops its operation in response to turn-on and turn-off of an ignition switch of the vehicle, respectively. The engine ECU 1 executes a main routine after being started and executes, as sub-routines in the main routine, user identification processing (step S1) and vehicle behavior data storing processing (step S2) as shown in FIG. 3. That is, the engine ECU 1 periodically executes the user identification processing and the vehicle behavior data storing processing at a predetermined interval while being operated. The user identification processing and the vehicle behavior data storing processing will be described in sequence.

(1) User Identification Processing

Figure 4:
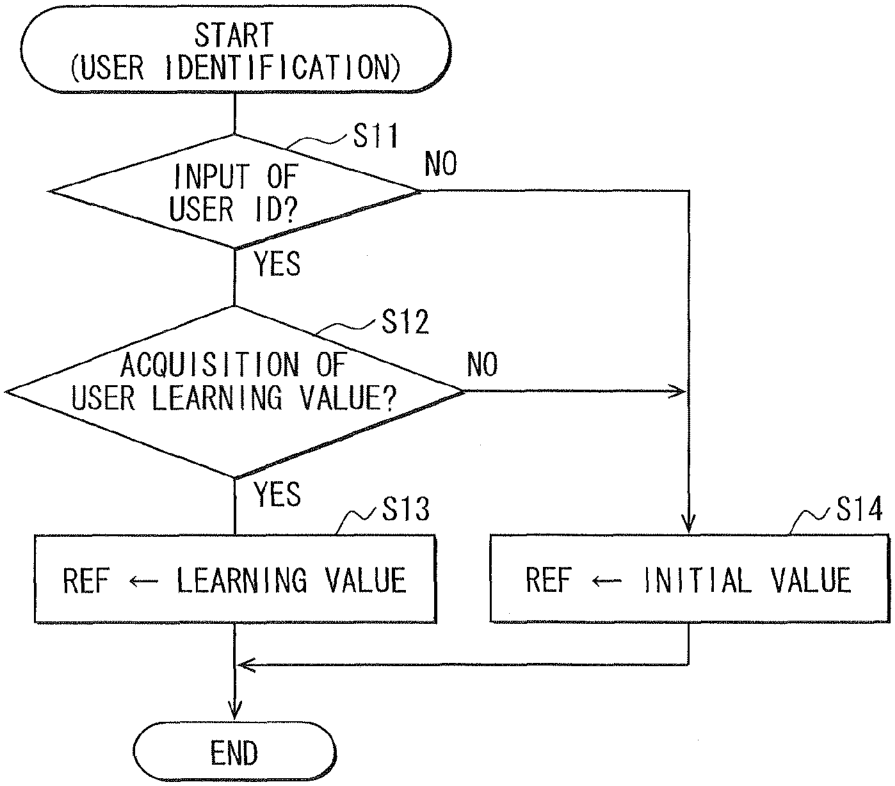
FIG. 4 is a flowchart showing a user identification process in the main routine.
Figure 5:
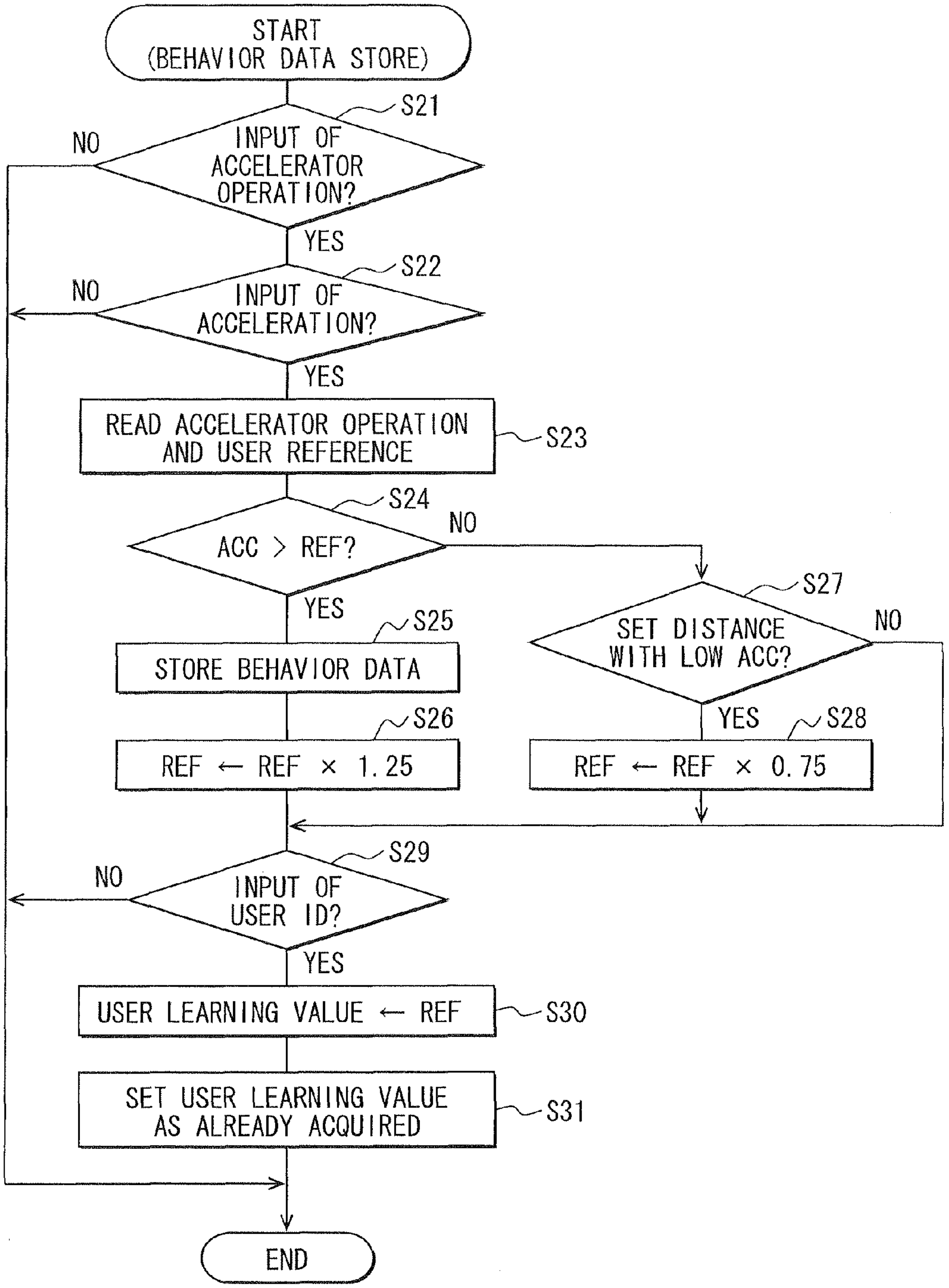
FIG. 5 is a flowchart showing a first exemplary vehicle behavior data storing process in the main routine.

The engine ECU 1 proceeds to the user identification processing shown in FIG. 4 from the main routine. After starting the user identification processing, the engine ECU 1 checks whether the user identification data has been inputted by the vehicle LAN IF part 12 from any one of the body ECU 2, the navigation ECU 3 and the driving license reader 6 (step S11).

When the engine ECU 1 determines that the user identification data has been inputted from the vehicle LAN IF part 12 (YES at S11), it checks whether the learning value, which corresponds to the user identified by the user identification data, has been acquired (step S12). The acquisition of user identification data may be determined: when the user identification data, which identifies a user operating the PDPS button 20 in response to user operation on the PDSP button 20, has been inputted from the vehicle LAN IF part 12; when the user identification data, which identifies a user carrying the cell phone 21 in response to connection of the cell phone 21 of the user and the navigation ECU 3, has been inputted from the vehicle LAN IF part 12; or when the user identification data, which identifies a user, which identifies a user carrying the driving license 22 in response to reading of driving license data by the driving license reader 6 from the driving license 22, has been inputted from the vehicle LAN IF part 12.

When the engine ECU 1 determines that the learning value corresponding to the user specified by the user identification data has been acquired (YES at step S12), it sets the acquired learning value as the reference value (REF) in the reference value memory part 18. The engine ECU 1 returns its processing to the main routine. When the engine ECU 1 determines that the user identification data has not been inputted yet (NO at step S11) or the learning value corresponding to the user identified by the user identification data has not been acquired yet (NO at step S12), it sets a predetermined initial value in the reference value memory part 18 as the reference value (step S14). The engine ECU 1 returns its processing to the main routine.

(2) Vehicle Behavior Data Storing Processing

When the engine ECU 1 starts the vehicle behavior data storing processing after proceeding from the main routine to the vehicle behavior data storing processing, it checks whether the accelerator operation value has been inputted from the accelerator sensor 13 by the accelerator operation value input part 8 (step S21). When the engine ECU 1 determines that the accelerator operation value has been inputted from the accelerator sensor 13 by the accelerator operation value input part 8 in response to the user operation of the accelerator pedal (YES at step S22), it further checks whether the acceleration value (ACC) has been inputted from the vehicle speed sensor 14 by the vehicle speed value input part 9 (step S22).

When the engine ECU 1 determines that the acceleration value has been inputted from the vehicle speed sensor 14 by the vehicle speed value input part 9 (YES at step S22), it reads out from the reference value memory part 18 the reference value, which corresponds to the user identified by the accelerator operation value inputted from the accelerator sensor 13 and the user identification data (step S23), and compares the inputted acceleration value with the read reference value (step S24). At step S23, S24, the engine ECU 1 determines the inputted reference value, which is compared with the inputted acceleration value, based on the accelerator operation value of the user at the same time of occurrence of the acceleration value and compares the inputted acceleration value and the reference value determined by the user accelerator operation value.

When the engine ECU 1 determines that the acceleration value is large and in excess of the reference value (YES at step S24), it outputs the storing command to the vehicle LAN IF part 12 and stores in the vehicle behavior data memory part 19 the vehicle behavior data inputted to the vehicle LAN IF part 12 from the various ECUs mounted in the vehicle through the vehicle LAN 7 (step S25). The engine ECU 1 calculates a new value by multiplying this reference value at that time by 1.25 by the reference value changing part 16 and sets the calculated value in the reference value memory part 18 as a new reference value (step S26). That is, immediately after storing the vehicle behavior data in the vehicle behavior data memory part 19, the engine ECU 1 sets the new reference value in the reference value memory part 18. By increasing, that is, changing the reference value to a larger value, the vehicle behavior data is made to be stored less frequently. Thus, the vehicle behavior data is not stored at the reference value, which is the same as the previous reference value, at which the vehicle behavior data was stored this time.

When the engine ECU 1 determines that the acceleration value is small and not in excess of the reference value (NO at step S24), it specifies the travel distance of the vehicle based on the distance sensor value inputted from the distance sensor 5 to the vehicle LAN IF part 12 through the vehicle LAN 7 and checks whether the travel distance in a low acceleration period, in which the acceleration value is not in excess of the reference value, has reached a set distance (step S27). The set distance is a predetermined distance, which may be set arbitrarily by a user or set by a manufacturer when a vehicle is shipped from a manufacturing plant. When the engine ECU 1 determines that the travel distance in the low acceleration period is not longer than the set distance (NO at step S27), it does not change the reference value at that time. When the engine ECU 1 determines that the travel distance in the low acceleration period is longer than the set distance (YES at step S27), it sets a value, which is calculated by multiplying the reference value at that time by 0.75 as a new reference value (step S28). That is, the engine ECU 1 sets the new reference value in the reference value memory part 18 at a time, which excludes immediately after the vehicle behavior data has been stored in the vehicle behavior data memory part 19, thus decreasing reference value. Thus it is made possible to store the vehicle behavior data more easily thereafter.

The engine ECU 1 checks whether the user identification data (ID) identifying the user has been inputted by the vehicle LAN IF part 12 (step S29). When the engine ECU 1 determines that the user identification data has been inputted by the vehicle LAN IF part 12 (YES at step S29), it sets the reference value at that time in the reference value memory part 18 as the learning value corresponding to the user identified by the user identification data (step S30). It further determines that the learning value corresponding to the user identified by the user identification data has been set (step S31) and returns its processing to the main routine.

By executing the above-described sequence of processing, when the acceleration value is in excess of the reference value, the engine ECU 1 changes the reference value to a larger value so that the vehicle behavior data is not stored in the vehicle behavior data memory part 19 at the same reference value next time after having stored the vehicle behavior data in the vehicle behavior data memory part 19. In addition, when the travel distance in the low acceleration period reaches the predetermined distance, the engine ECU 1 changes the reference value to a smaller value and sets the new reference value so that the vehicle behavior data is stored in the vehicle behavior data memory part 19 more often.

Figure 6:
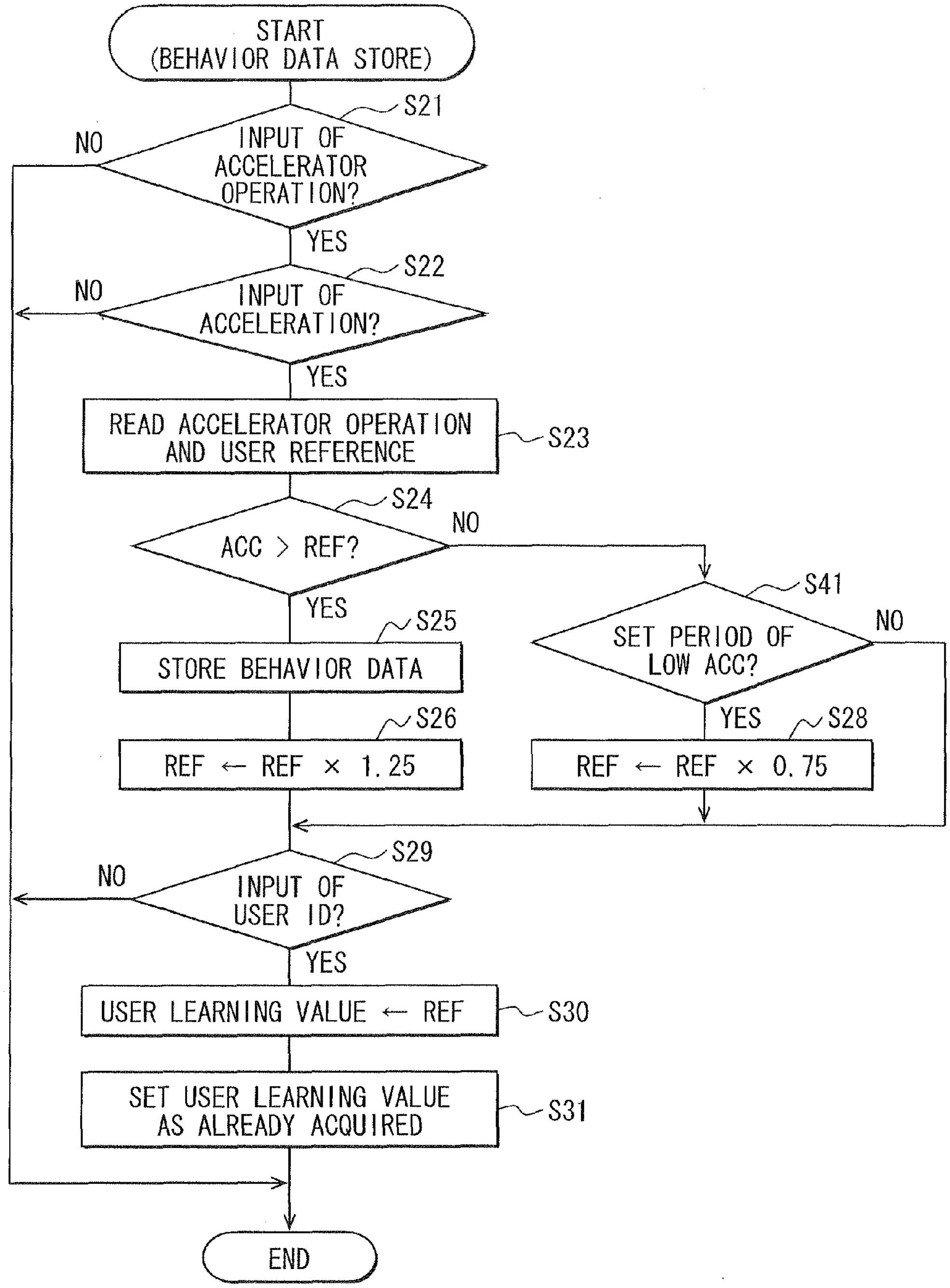
FIG. 6 is a flowchart showing a second exemplary vehicle behavior data storing process in the main routine.

In the above-described operation, it is checked whether the reference value is changed to the smaller value based on the travel distance in the low acceleration period. It is also possible to check whether the reference value is changed to the smaller value based on the low acceleration period. That is, as shown in FIG. 6, when the engine ECU 1 determines that the acceleration value is small and not in excess of the reference value (NO at step S24), it may check whether the low acceleration period, in which the acceleration value is not in excess of the reference value, has reached a set period (step S41). When the engine ECU 1 determines that the low acceleration period has reached the set period (YES at step S41), it may set the value, which is calculated by multiplying the reference value at that time by 0.75, as the new reference value. Thus, the set period is shortened so that the vehicle behavior data is stored more often when the low acceleration state continues long. The set period is a predetermined period, which may be set by a user arbitrarily or set by a manufacturer at the time of shipment from a manufacturing plant.

Figure 7:
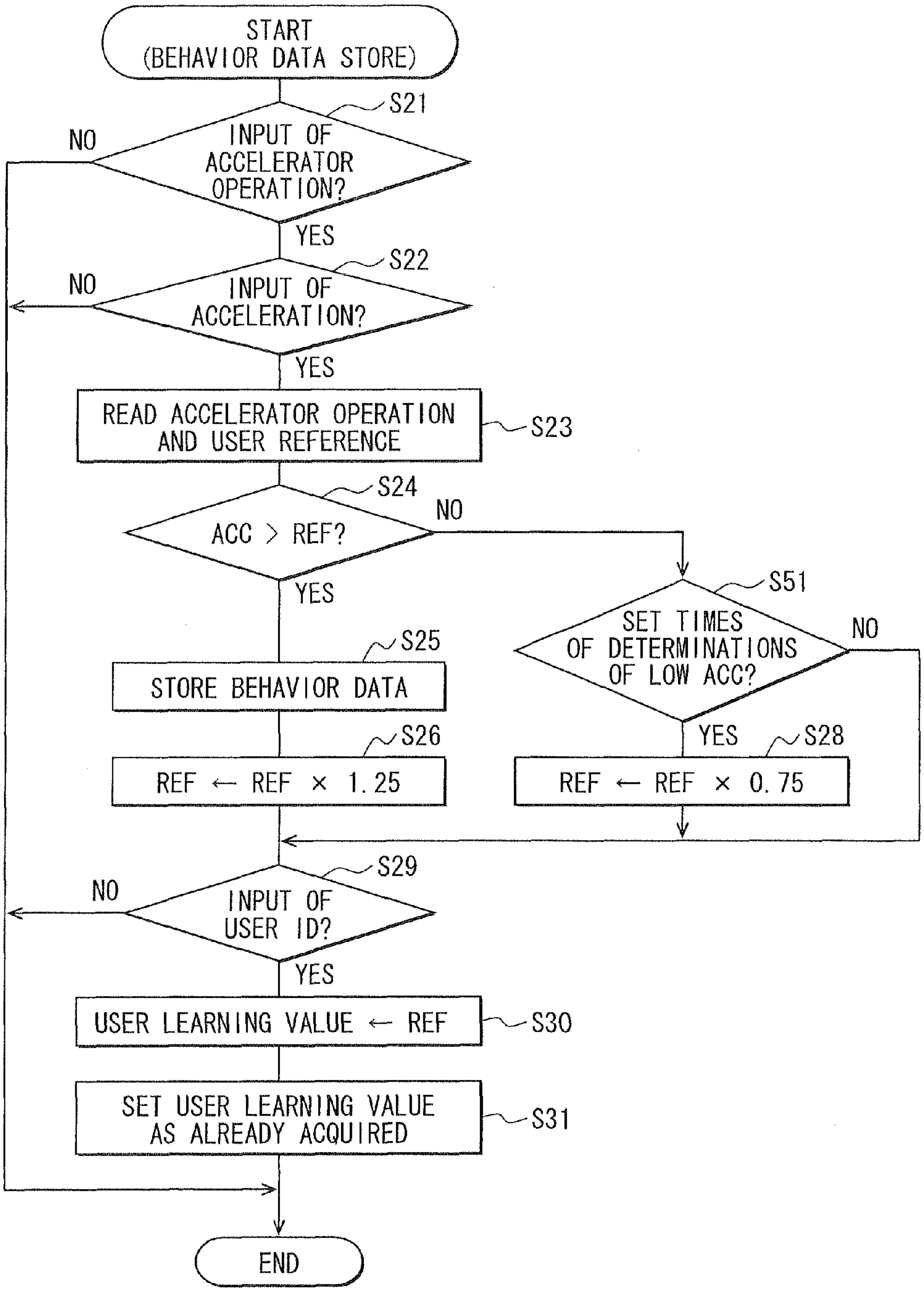
FIG. 7 is a flowchart showing a third exemplary vehicle behavior data storing process in the main routine.

It is further possible to check whether the reference value should be changed to a smaller value based on the number of times of determinations that the acceleration value is low, that is, not in excess of the reference value. That is, as shown in FIG. 7, when the engine ECU 1 determines that the acceleration value is low (NO at step S24), it may check whether the number of times of successive determinations that the acceleration value is low has reached a set number of times (step S51). When the engine ECU 1 determines that the number of times of successive determinations that the acceleration value does not exceed the reference value has reached the set number of times (YES at step S51), it may set a smaller value, which is calculated by multiplying the reference value at that time by 0.75, as the new reference value. The set number of times is a predetermined number, which may be set by a user arbitrarily or set by a manufacturer at the time of shipment from a manufacturing plant.

Figure 8:
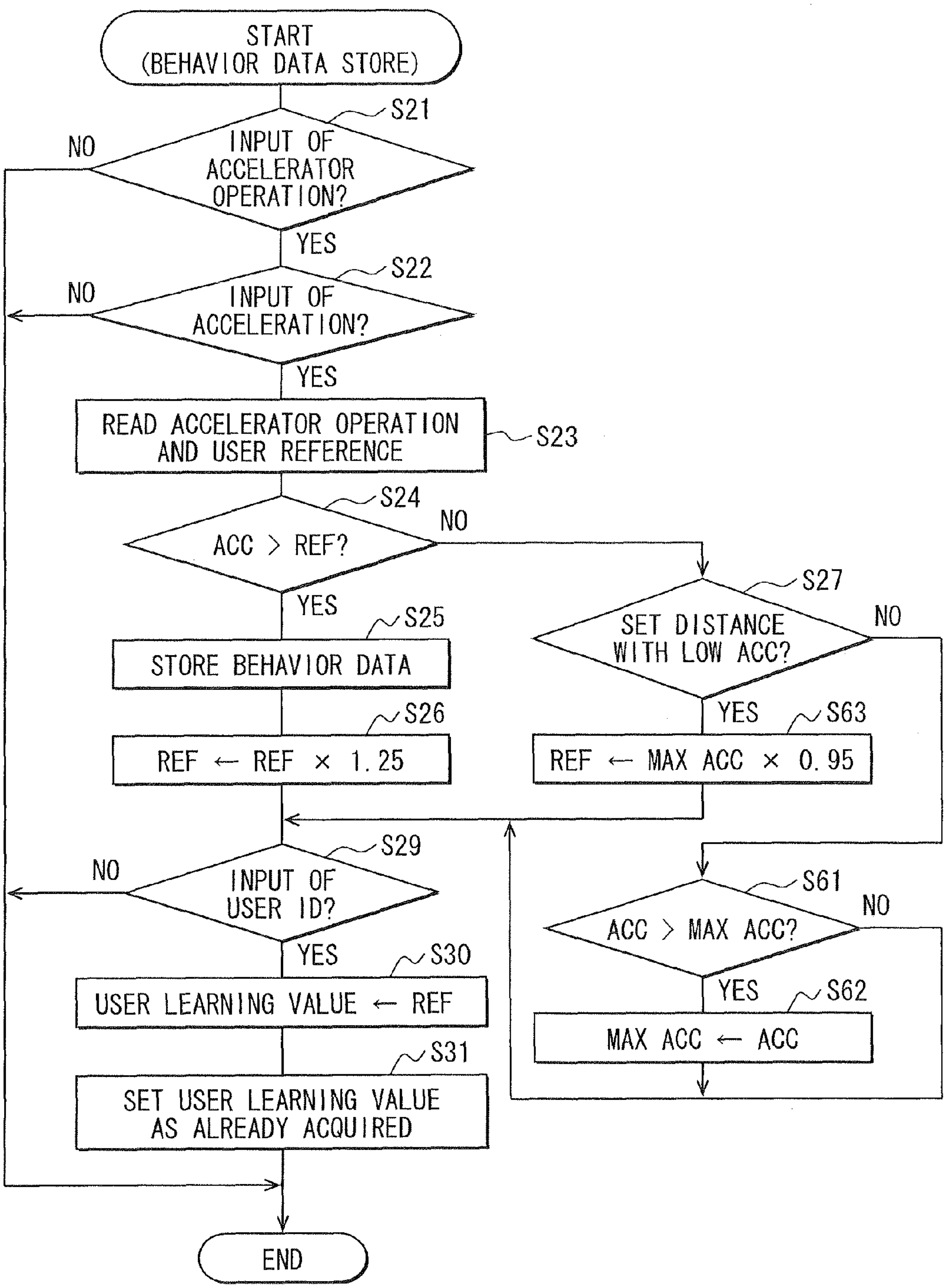
FIG. 8 is a flowchart showing a fourth exemplary vehicle behavior data storing process in the main routine.

In the above-described operation, the reference value is changed to the smaller value by setting the value, which is calculated by multiplying the reference value at that time by 0.75, as the new reference value. It is also possible to set a new reference value in correspondence to a maximum acceleration value (MAX ACC) by updating and storing from time to time a maximum acceleration value among the acceleration values, which are inputted from the vehicle speed sensor 14. That is, as shown in FIG. 8, when the engine ECU 1 determines that the travel distance in the low acceleration period has not reached the set distance (NO at step S27), it compares the acceleration value with the maximum acceleration value at that time (step S61). When the engine ECU 1 determines that the acceleration value is high, that is, in excess of the maximum acceleration value (YES at step S61), it sets the acceleration value at that time as the new maximum acceleration value (step S62). When the engine ECU 1 determines that the travel distance in the low acceleration period has reached the set distance (YES at step S27), it may set the new reference value by multiplying the maximum acceleration value at that time by 0.95.

Figure 9:
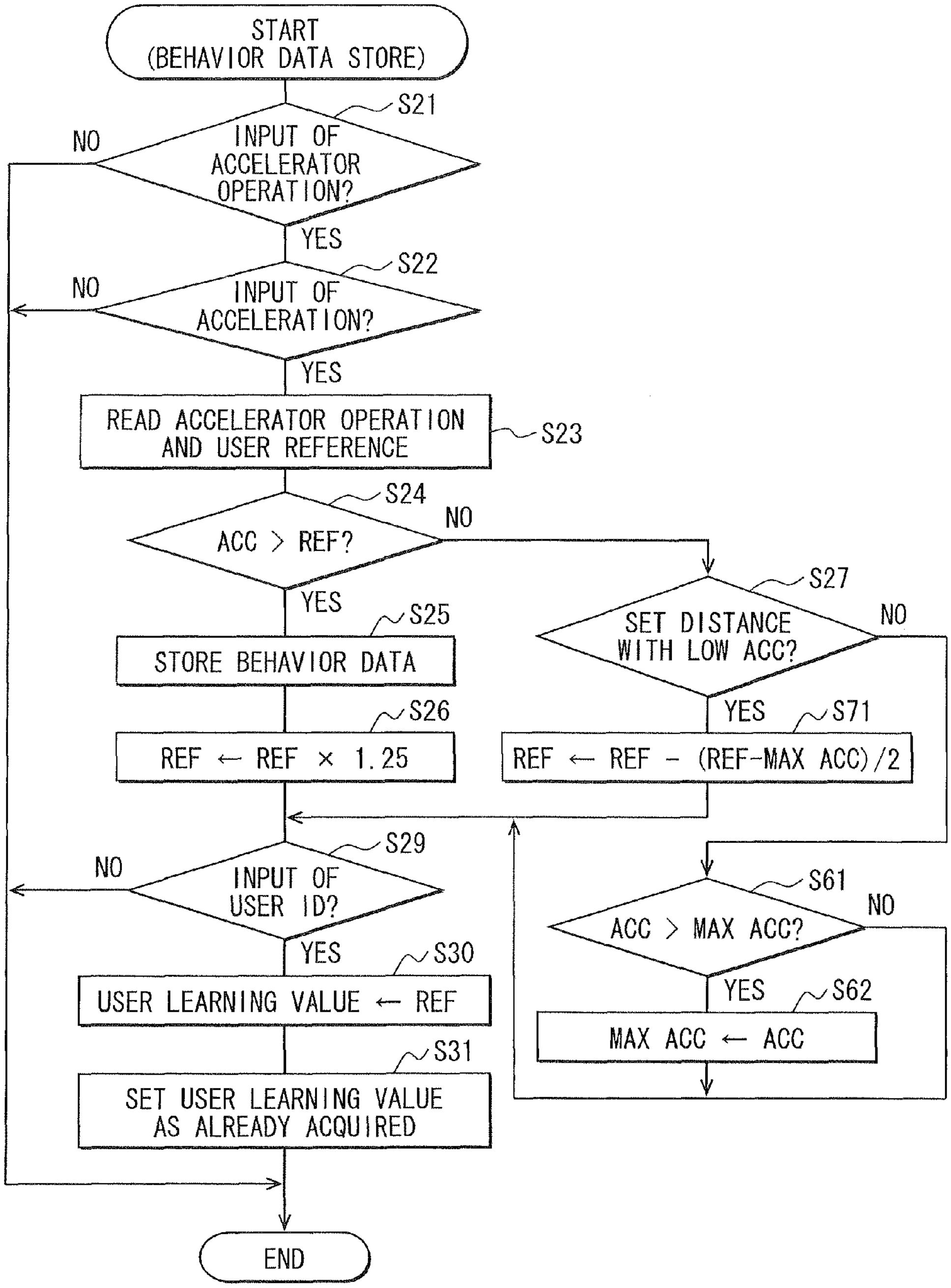
FIG. 9 is a flowchart showing a fifth exemplary vehicle behavior data storing process in the main routine.

Further, as shown in FIG. 9, when the engine ECU 1 determines that the travel distance in the low acceleration period has reached the set distance (YES at step S27), it may set the new reference value by subtracting from the reference value a value, which is calculated by multiplying a difference between the maximum acceleration value and the reference value at that time by 0.5 (step S71). It is possible to set the new reference value corresponding to the maximum acceleration value by successively updating and storing the maximum acceleration value also in cases of checking whether the low acceleration period has reached the set period (processing in FIG. 6), whether the number of times of successive determinations that the acceleration value is not in excess of the reference value has reached the set number of times (processing in FIG. 7).

As described above, the present embodiment is configured to compare the acceleration value with the reference value corresponding to the accelerator operation value inputted when the user operated the accelerator pedal, and store the vehicle behavior data in the vehicle behavior data memory part 19 on condition that the acceleration value is large, that is, exceeds the reference value. In this configuration, when the vehicle behavior data is stored in the vehicle behavior data memory part 19 by determining that the acceleration value is large, the reference value is changed to the larger value. When it is determined that the acceleration value is low and the low acceleration period has reached the set period, the reference value is changed to the smaller value. Thus, the reference value, which is a threshold for checking whether the vehicle behavior data should be stored, is changed. As a result, by changing the reference value such that the number of times that the acceleration value exceeds the reference value becomes constant (to eliminate variations), the volume of stored data of the vehicle behavior can be made constant and variation in the number of times of determinations that the vehicle behavior is abnormal can be reduced among the users.

Further, the embodiment is configured such that the vehicle behavior data is stored less frequently by changing the reference value to the larger value immediately after storing the vehicle behavior data. It is thus difficult to store the vehicle behavior data relative to the same reference value. As a result, continuation of repetition of storing the vehicle behavior data under the same reference value can be avoided and the storage areas of the vehicle behavior data memory part 19, which is not limitless, can be used efficiently. The embodiment is further configured such that the vehicle behavior data is stored more often by changing the reference value to the smaller value at times other than immediately after storing the vehicle behavior data. It is thus possible to avoid that the vehicle behavior data is not stored for a long time and to store the vehicle behavior data appropriately.

By thus reducing among users the variation in the numbers of determinations that the vehicle behavior is abnormal, the vehicle behavior data present when the user senses unusualness can be stored appropriately. That is, a user, who tends to perform low acceleration in normal driving operation, will sense unusualness indicating abnormal behavior of the vehicle when the vehicle acceleration becomes slightly high than in the normal driving operation even under the condition that the acceleration value is lower than the reference value. A user, who tends to perform high acceleration in the normal driving operation, will not sense unusualness indicating abnormal behavior of the vehicle even when the acceleration value becomes higher than the reference value in the normal acceleration. However, by changing the reference value to reduce the variation in the number of determinations that the acceleration value is in excess of the reference value, the threshold condition, which is used to check whether the vehicle behavior data should be stored, can be changed to match the driving style of each user and the vehicle behavior data present at the time when the user feels unusualness can be stored appropriately.

The vehicle behavior data storing apparatus is not limited to the above-described embodiment and may be modified as exemplified below. The vehicle behavior data inputting part formed by the vehicle LAN IF part 12 and the vehicle behavior data memory part formed by the vehicle behavior data memory part 19 may be integrated in the same function block.

The condition for storing the vehicle behavior data is not limited to the determination of acceleration in correspondence to user operations on the accelerator pedal, but may be a determination of deceleration caused by user operations on a brake pedal or a determination of steering angle caused by user operations on a steering wheel.

It is assumed in the embodiment that the vehicle behavior data is stored on condition that the acceleration value exceeds the reference value and the reference value is changed to the larger value not to store the vehicle behavior data in succession based on the same reference value. However, as far as the embodiment is configured such that the vehicle behavior data is stored on condition that any one of values is not in excess of its reference value, the reference value may be changed to a smaller value not to store the vehicle behavior data in succession based on the same reference value after the vehicle behavior data has been stored as a result of determination that any one of the values is not in excess of the reference value.

The vehicle behavior data, which is stored on condition that the acceleration value exceeds the reference value, may be other items different from the above-described items. As a method for identifying a user, other methods of identification of a user such as analyzing a photographed image of a face of a driver may be adopted. As a condition for changing the reference value in case that the acceleration value is determined to be lower than the reference value, other conditions such as the number of times of vehicle stops at intersections may be adopted without limitation to the travel distance, the period and the number of times.

The value to be multiplied to change the reference value may be other values than 1.25, 0.75 and 0.95. The user identification function may be omitted in a case that the driver is fixed, that is, the user and the vehicle behavior data memory device correspond to each other. Checking of the acceleration value is not limited to checking of the calculated acceleration value, which is calculated to indicate the acceleration by differentiating by time the speed sensor value outputted from the vehicle speed sensor 14. The checking may be made to the acceleration sensor value inputted from the acceleration sensor 4 through the vehicle LAN 7.

Figure 10:
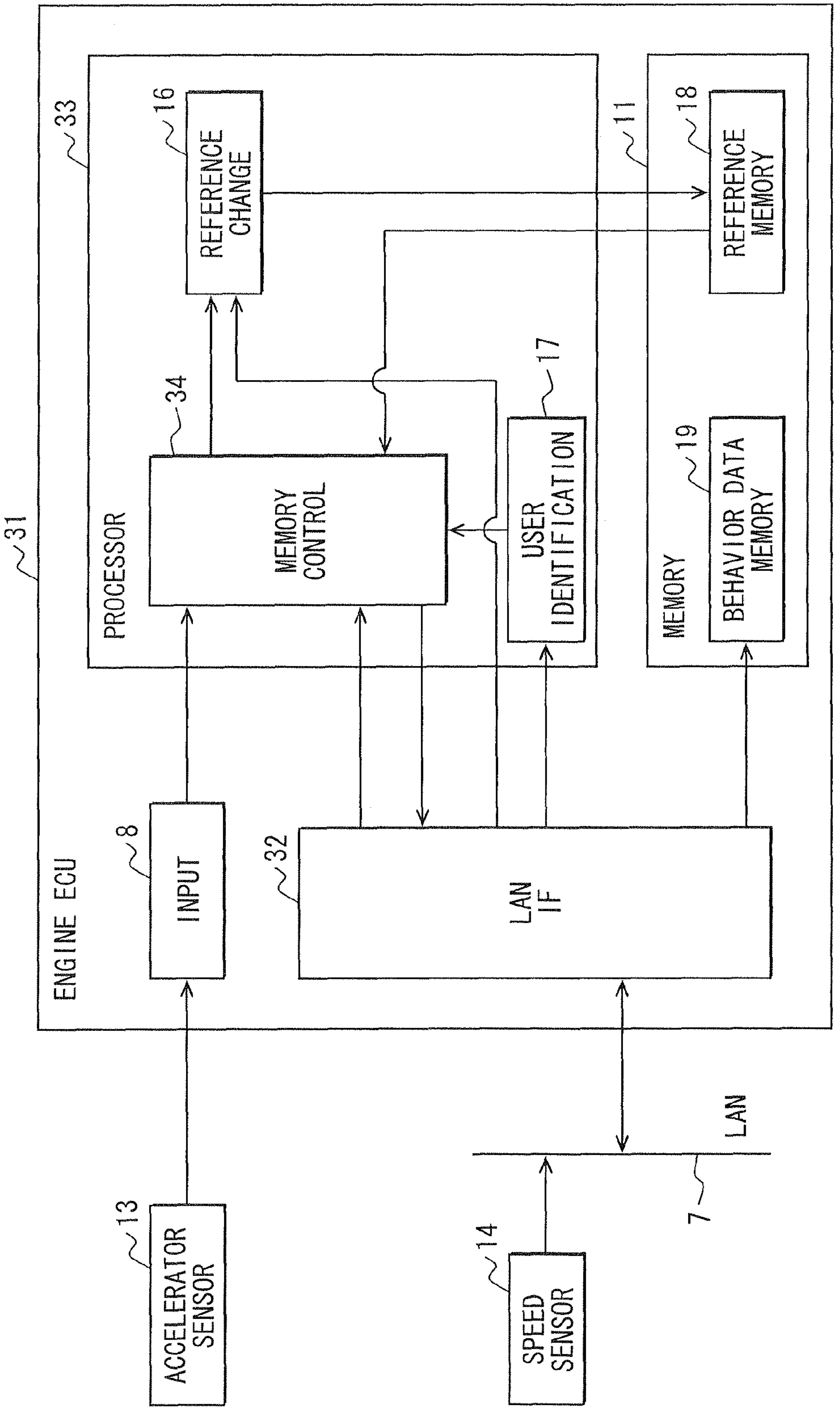
FIG. 10 is a functional block diagram showing another embodiment of a vehicle behavior data storing apparatus.

The vehicle speed sensor value outputted from the vehicle speed sensor 14 need not be inputted directly to the engine ECU 1 (vehicle speed sensor value inputting part 9). As shown in FIG. 10, the vehicle speed sensor value outputted from the vehicle speed sensor 14 may be inputted to an engine ECU 31 (vehicle LAN IF part 32) through the vehicle LAN 7. That is, in the engine ECU 31 in FIG. 10, the vehicle speed sensor value outputted from the vehicle speed sensor 14 is inputted to the vehicle LAN IF part 32 as one data of the vehicle behavior data. The vehicle LAN IF part 32 corresponds to the vehicle behavior data inputting part and the vehicle behavior data inputting part. Thus, the vehicle behavior data inputting part operates as the vehicle behavior data inputting part. In this example, the vehicle LAN IF part 32 outputs the vehicle speed sensor value to the storage control part 34 of a processor 33. When the storage control part 34 inputs the vehicle speed sensor value from the vehicle LAN IF part 32, it differentiates the inputted vehicle speed sensor value by time to calculate the acceleration value indicative of the acceleration and compares the calculated acceleration value with the reference value.

What is claimed is:

1. A vehicle behavior data storing apparatus comprising:

a reference value memory part for storing a reference value;

a vehicle behavior value inputting part for inputting a vehicle behavior value indicating a degree of vehicle behavior;

a vehicle behavior data inputting part for inputting a vehicle behavior data indicative of the vehicle behavior;

a vehicle behavior data memory part for storing the vehicle behavior data inputted by the vehicle behavior data inputting part;

a computer processor comprising:

a memory control part for comparing the vehicle behavior value inputted by the vehicle behavior value inputting part with the reference value stored in the reference value memory part, and storing in the vehicle behavior data memory part the vehicle behavior data inputted by the vehicle behavior data inputting part when a comparison result indicates that the vehicle behavior value satisfies a predetermined condition relative to the reference value; and a reference value changing part for changing the reference value stored in the reference value memory part when the vehicle behavior data is stored in the vehicle behavior data memory part; wherein the reference value changing part is configured to change the reference value stored in the reference value memory part immediately after the memory control part stores the vehicle behavior data in the vehicle behavior data memory part such that the vehicle behavior data is stored less frequently in the vehicle behavior data memory part than before the change.

2. The vehicle behavior data storing apparatus according to claim 1, the computer processor further comprising:

a user identification part for identifying a user of a vehicle, wherein the reference value memory part is configured to store the reference value for each user identified by the user identification part, and wherein the reference value changing part is configured to change the reference value stored in the reference value memory part for the each user.

3. The vehicle behavior data storing apparatus according to claim 2, wherein:

the user identification part identifies the each user based on a personal effect of the each user.

4. The vehicle behavior data storing apparatus according to claim 1, wherein:

the vehicle behavior data inputting part is configured to operate also as the vehicle behavior value inputting part thereby to input the vehicle behavior value as one of the vehicle behavior data.

5. The vehicle behavior data storing apparatus according to claim 1, wherein the reference value, the vehicle behavior value and the vehicle behavior data are related to vehicle acceleration.

6. A vehicle behavior data storing apparatus comprising:

a reference value memory part for storing a reference value;

a vehicle behavior value inputting part for inputting a vehicle behavior value indicating a degree of vehicle behavior;

a vehicle behavior data inputting part for inputting a vehicle behavior data indicative of the vehicle behavior;

a vehicle behavior data memory part for storing the vehicle behavior data inputted by the vehicle behavior data inputting part;

a computer processor comprising:

a memory control part for comparing the vehicle behavior value inputted by the vehicle behavior value inputting part with the reference value stored in the reference value memory part, and storing in the vehicle behavior data memory part the vehicle behavior data inputted by the vehicle behavior data inputting part when a comparison result indicates that the vehicle behavior value satisfies a predetermined condition relative to the reference value; and a reference value changing part for changing the reference value stored in the reference value memory part when the vehicle behavior data is stored in the vehicle behavior data memory part; wherein the reference value changing part is configured to change the reference value stored in the reference value memory part such that the vehicle behavior data is stored more frequently in the vehicle behavior data memory part than before the change, when the memory control part fails to store the vehicle behavior data in the vehicle behavior data memory part for more than a predetermined interval.

7. The vehicle behavior data storing apparatus according to claim 6, wherein:

the reference value changing part is configured to change the reference value stored in the reference value memory part such that the vehicle behavior data is stored more frequently in the vehicle behavior data memory part based on a number of times that the vehicle behavior value fails to satisfy the predetermined condition.

8. The vehicle behavior data storing apparatus according to claim 6, the computer processor further comprising:

a user identification part for identifying a user of a vehicle, wherein the reference value memory part is configured to store the reference value for each user identified by the user identification part, and wherein the reference value changing part is configured to change the reference value stored in the reference value memory part for the each user.

9. The vehicle behavior data storing apparatus according to claim 8, wherein:

the user identification part identifies the each user based on a personal effect of the each user.

10. The vehicle behavior data storing apparatus according to claim 6, wherein the reference value, the vehicle behavior value and the vehicle behavior data are related to vehicle acceleration.

* * * * *